United States Patent [19]
Underwood et al.

[11] Patent Number: 5,441,575
[45] Date of Patent: Aug. 15, 1995

[54] AMTEC VAPOR-VAPOR SERIES CONNECTED CELLS

[75] Inventors: Mark L. Underwood, Monrovia; Roger M. Williams, Azusa; Margaret A. Ryan, Pasadena; Barbara J. Nakamura, San Marino; Dennis E. O'Connor, Upland, all of Calif.

[73] Assignee: The United States of America as represented by the United States National Aeronautics and Space Administration, Washington, D.C.

[21] Appl. No.: 4,162

[22] Filed: Jan. 11, 1993

[51] Int. Cl.$^6$ .............................. H01L 37/00
[52] U.S. Cl. ................... 136/202; 136/205; 429/104; 429/112; 429/120
[58] Field of Search ............ 136/200, 202, 205; 429/5, 11, 50, 104, 112, 120

[56] References Cited

U.S. PATENT DOCUMENTS

| | | | |
|---|---|---|---|
| 3,458,356 | 7/1969 | Kummer et al. | 136/83 |
| 4,042,757 | 8/1977 | Jones | 429/104 |
| 4,049,877 | 9/1977 | Sailiant et al. | 429/11 |
| 4,098,958 | 7/1978 | Bettman | 429/17 |
| 4,175,164 | 11/1979 | Cole | 429/11 |
| 4,220,692 | 9/1980 | Hunt | 429/104 |
| 4,505,991 | 3/1985 | Weber | 429/11 |
| 4,510,210 | 4/1985 | Hunt | 429/11 |
| 5,039,351 | 8/1991 | Cooper et al. | 136/202 |
| 5,089,054 | 2/1992 | Sievers | 136/202 |
| 5,228,922 | 7/1993 | Sievers | 136/202 |

OTHER PUBLICATIONS

N. Weber, "A Thermoelectric Device Based on Beta Alumina Solid Electrolyte," Energy Conversion, 14, 1974, pp. 1-8.
R. M. Williams, et al., "Kinetics and Transport at AMTEC Electrodes, I. The Interfacial Impedance Model," J. Electrochem. Soc., 137, 1990, pp. 1709-1716.
R. M. Williams, et al., "Kinetics and Transport at AMTEC Electrodes, II. Temperature Dependance of the Interfacial Impedance of Na$_{(g)}$/Porous Mo/Na-B Alumina," J. Electrochem. Soc., 137, 1990, pp. 1716-1723.
C. P. Bankston, et al., "Alkali Metal Thermoelectric Conversion (AMTEC) for Space Nuclear Power Systems," SPACE NUCLEAR POWER SYSTEMS, 1984 Orbit Book Co., Malabar, Fla., 1985, pp. 393-402.
R. K. Sievers, et al., "Radioisotope Powered Alkali Metal Thermoelectric Converter Design for Space Systems," Proceedings of the 23rd Intersociety Energy Conversion Engineering Conference, vol. 3, 1988, pp. 159-167.
N. Weber, et al., "Design and Performance of a Small Circulating Sodium Heat Engine," Proceedings of the 23rd Intersociety Energy Conversion Conference, American Society of Mechanical Engineers, 1988, pp. 215-217.

*Primary Examiner*—Donald P. Walsh
*Assistant Examiner*—Chrisman D. Carroll
*Attorney, Agent, or Firm*—John H. Kusmiss; Thomas H. Jones; Guy M. Miller

[57] ABSTRACT

An alkali metal thermoelectric converter (AMTEC) having a plurality of cells structurally connected in series to form a septum dividing a plenum into two chambers, and electrically connected in series, is provided with porous metal anodes and porous metal cathodes in the cells. The cells may be planar or annular, and in either case a metal alkali vapor at a high temperature is provided to the plenum through one chamber on one side of the wall and returned to a vapor boiler after condensation at a chamber on the other side of the wall in the plenum. If the cells are annular, a heating core may be placed along the axis of the stacked cells. This arrangement of series-connected cells allows efficient generation of power at high voltage and low current.

4 Claims, 3 Drawing Sheets

AMTEC VAPOR-VAPOR SERIES CONNECTED CELLS

ORIGIN OF INVENTION

The invention described herein was made in the performance of work under a NASA contract, and is subject to the provisions of Public Law 96-517 (35 USC 202) in which the contractor has elected not to retain title.

TECHNICAL FIELD

This invention relates to series-connected, alkali metal thermoelectric converter (AMTEC) cells, and more particularly to series-connected AMTEC cells which do not use a liquid metal alkali anode as in the past. Instead, a metal alkali vapor is supplied to a porous metal anode of each cell from a boiler.

BACKGROUND ART

The AMTEC cell is a thermally regenerative electrochemical power cell used in space power systems for production of electricity from very high heat sources. It may also be used terrestrially as a remote power source, or as a vehicular (land, sea or water) power source, and at a lower scale as a co-generation power source wherever very high heat waste is present at an industrial plant. In a small scale, it is particularly useful wherever limitations on system mass or volume are severe, such as in spacecraft or satellites.

Typical heat input temperatures range from 900° to 1200° K. with heat rejection temperatures from 400° to 800° K. In the high temperature region, AMTEC technology uses a beta-alumina type solid electrolyte (BASE) plate to separate high activity sodium (Na) from a region in which the sodium activity is kept low by a condenser operating at the heat rejection temperature. BASE is a conductor of sodium ions (Na+) and an insulator for electrons.

Typical AMTEC designs use liquid Na as the anode on the high activity side [C. P. Bankston, T. Cole, S. K. Khanna and A. P. Thakoor, "Alkali Metal Thermoelectric Conversion (AMTEC) for Space Nuclear Power Systems," *Space Nuclear Power Systems*, 1984, Orbit Book Co., Malabar, Fla., 1985, pp. 393-402; R. K. Sievers and C. P. Bankston, "Radioisotope Powered Alkali Metal Thermoelectric Converter Design for Space Systems," *Proceedings of the 23rd Intersociety Energy Conversion Engineering Conference*, Vol. 3, 1988, pp. 159-167; N. Weber, J. R. Rasmussen, G. Harkins and S. L. Olsen, "Design and Performance of a Small Circulating Sodium Heat Engine," *Proceedings of the 23rd Intersociety Energy Conversion Engineering Conference*, The American Society of Mechanical Engineers, 1988, pp. 215-217, all of which are incorporated herein by reference]. At 1160° K., the vapor pressure of Na is 1 atm while the Na vapor pressure at the condenser is $10^{-5}$ atm or less. This vapor pressure ratio results in an electrical potential across the BASE of up to 1.6 V. Electrodes on either side of the BASE provide sites for an electrochemical reaction required at the interface.

On the high activity side, the liquid Na anode provides sites for Na oxidation. On the low activity side of the BASE, the cathode (typically a thin, porous metal) provides sites for reduction of Na+. Electrical power can be drawn from the cell when the anode and cathode are connected to a load. A complete description of the AMTEC cycle has been published previously. [N. Weber, "A Thermoelectric Device Based on Beta Alumina Solid Electrolyte," *Energy Conversion*, 14, 1974, pp. 1-8, incorporated herein by reference.]

AMTEC cells produce electrical power at high efficiency and power density, but the output per cell is typically about 0.5 V and up to 100 A at maximum power. Power conditioning electronic circuits cannot efficiently convert this low voltage, high current power to a more useful voltage level. Previous AMTEC systems designs required connecting independent modules in series to produce a more useful voltage to the power conditioning electronic circuit. While highly redundant, that approach resulted in systems with significant mass and volume attributed to nonpower producing components.

Previous vapor-fed designs used sodium phase change to supply sodium working fluid and additional heat to the cell. Some of the sodium refluxes back to the boiler. As yet unknown is the effect of using very low oxygen content sodium on the beta alumina solid electrolyte during such a reflux process. Over time, the sodium may act as a getter to extract oxygen from the electrolyte and deposit it on the metal walls of the sodium boiler.

In order to achieve very high efficiency operation, previous AMTEC designs require electrical feedthroughs that operate at high temperature in a sodium environment. Under such conditions, the required insulator may degrade and limit the life of the cell.

STATEMENT OF THE INVENTION

In accordance with the present invention, an array of AMTEC cells electrically connected in series is provided in a plenum with a metal alkali vapor, preferably one selected from a group consisting of potassium and sodium. The metal alkali vapor passing through the cells in parallel is then recirculated through a boiler.

Each cell comprises a porous solid electrolyte plate comprising a beta alumina solid electrolyte (referred to herein as a ceramic plate, ceramic BASE plate, or more simply BASE or BASE plate) with a porous metal layer deposited on one side of the plate functioning as an anode and a porous metal layer deposited on the other side of the ceramic plate functioning as a cathode. Conductive metal plates between cells of the array are provided to bridge gaps between the cells, each in contact with the ceramic plate of adjacent cells. These metal plates then serve as electrical connectors for connecting the cells electrically in series while serving to form with the ceramic plates a wall that divides the plenum into two chambers by using a braze seal to secure the connector plates to the ceramic plates and the wall to the plenum.

The metal alkali vapor from the boiler is introduced at high temperature and a pressure at 0.02 to 2.0 atm into the anode side of the septum. After passing through the porous anodes and cathodes of the cells, the sodium vapor is condensed and then returned to the boiler for reuse. In that manner, vapor-vapor AMTEC cells are provided that are series-connected within the plenum for high output voltage with high efficiency.

In a preferred embodiment, the plenum is cylindrical, and the wall formed by the brazed ceramic plates and metal connector plates is tubular with the anodes inside and the cathodes outside the tubular cell wall, thus forming two tubular chambers separated by the tubular side wall. The vapor is introduced into the chamber inside the tubular cell wall at one end, and after passing through the tubular cell wall is condensed at an outer wall of the outer chamber. It is then returned to the boiler through a port in the outer chamber at an end opposite the input vapor end of the inner chamber. A heater core (rod or tube consisting of a heat pipe in general) is positioned along the axis of the tubular cell wall to assist in maintaining the vapor at a high temperature as it passes through the space within the inner chamber and through the cell wall, and to heat the cell wall to prevent condensation of the metal alkali vapor on the cell electrodes.

The novel features that are considered characteristic of this invention are set forth with particularity in the appended claims. The invention will best be understood from the following description when read in connection with the accompanying drawings.

DETAILED DESCRIPTION OF THE INVENTION

Figure 1:
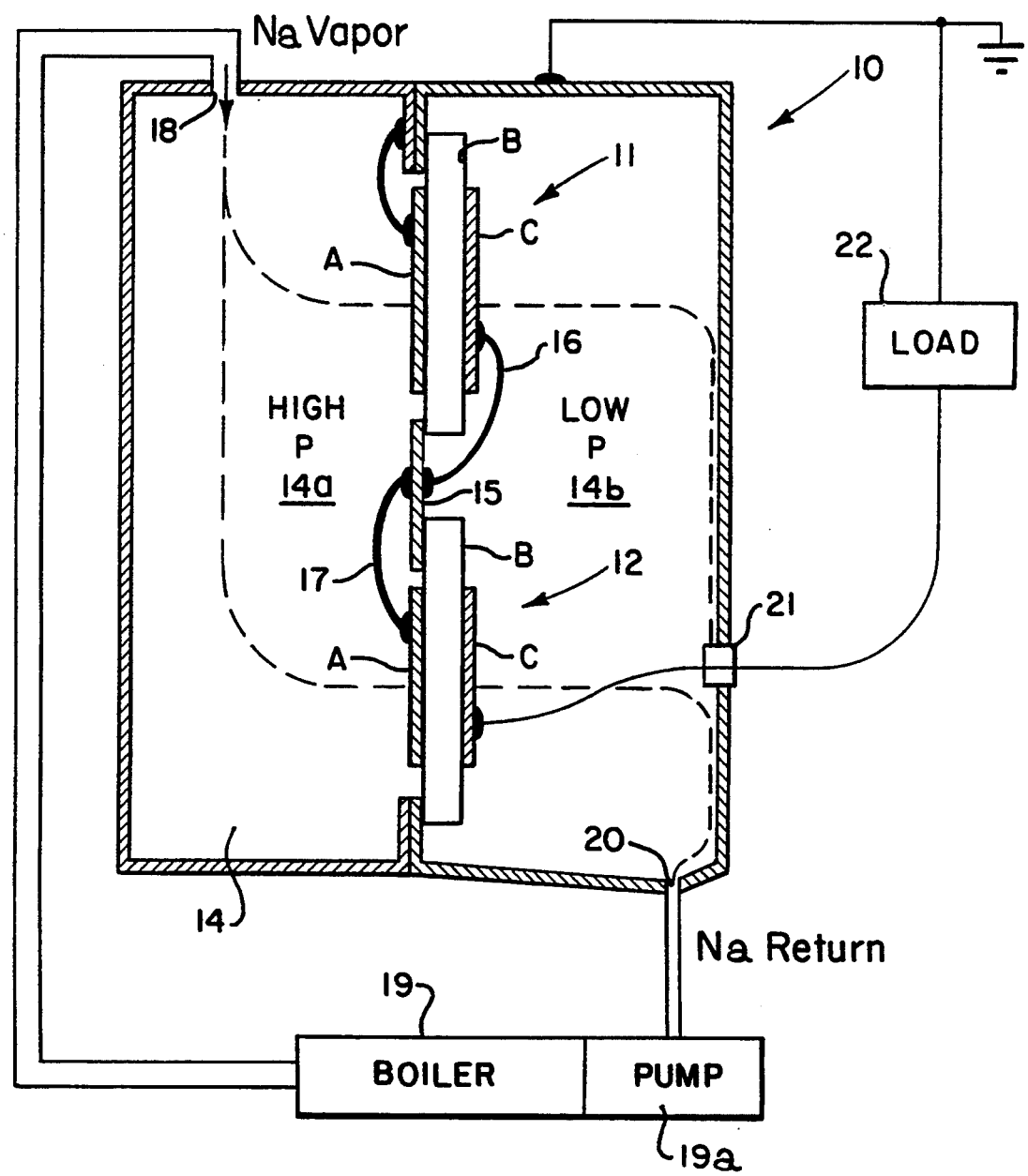
FIG. 1 illustrates the concept of the present invention with two series-connected planar AMTEC cells in a vapor-vapor (vapor in and vapor out) plenum.

A schematic diagram of an AMTEC voltage generator structure 10 that embodies the vapor-vapor concept of the present invention is illustrated in FIG. 1 with two cells 11, 12 electrically connected in series in a plenum 14 made of sodium corrosion resistant and fairly refracting alloy, such as Nb-Zr (1%) for low temperature applications and a TiZrMo alloy for high temperatures. The cells are supplied on the interior of the plenum with Na vapor at 0.02 to 2.0 atm pressure.

Each cell comprises a beta alumina solid electrolyte (BASE) plate B (hereinafter referred to as a ceramic plate or a ceramic BASE plate) and a porous metal layer A deposited on one side of the ceramic plate to function as an anode. The beta alumina is preferably $\beta''$ alumina comprising rhombohedral crystallization phase $NaAl_5O_3$ with stabilization ion substituting for small percentage of Al, the stabilization ion being a monovalent or divalent cation, such as $Li^+$ $Mg^{++}$, $Zn^{++}$, $Ni^{++}$, $Co^{++}$ or $Na^+$, for example, $(Na_2O)_{5/3} (MgO)_{\frac{2}{3}} (Al_2O_3)_{31/3}$. A porous metal layer C is deposited on the other side of the ceramic plate to function as a cathode. These porous metal layers used for anode and cathode electrodes may be sputtered molybdenum, titanium, tungsten or other metal alloyed with platinum or rhodium, for example.

The cathode C of cell 11 is connected through a metal connector plate 15 to the anode A of cell 12, and so on with other cells (not shown) along a series of more than two cells if even higher output voltage is desired. The metal connector plates may be made of the same material as the plenum or Ta.

The series-connected cells form a wall that divides the plenum into two chambers 14a and 14b. The connector plates 15 are secured to the ceramic plates with seals in order that they not only serve to seal gaps between cells but also to form a sealed wall between the vapor input (higher pressure) chamber 14a and the vapor condensation (low pressure) chamber 14b of the plenum 14. The negative and positive leads 16 and 17 shown connecting the anode and cathode electrodes to the connector plate 15 could be simply extensions of the cathode electrode C and anode electrode A with brazed connections between the ceramic plates and the connector plate. Brazing the connector plate to the ceramic plate as well as to the anode and cathode electrodes may be done using $Ti_{70}Cu_{15}Ni_{15}$ or $Ti_{70}Ni_{30}$ in one step as the fusible alloy.

Na vapor is continually introduced through an input port 18 from a boiler 19 and, after passing through the cells, allowed to condense into a liquid for recirculating back through an outlet port 20 of the AMTEC structure 10. A pump 19a at the boiler moves the condensed Na into the heating space of the boiler for revaporization. For example, as the Na vapor in the low pressure chamber 14b condenses along the wall of that chamber, a wick which covers the inside of the condenser wall and extends through the port 20 into the pump 19a carries the liquid Na into the pump, and the pump itself may be a capillary pump. In that manner, the AMTEC structure 10 may function while oriented in any position, not just the vertical position shown in FIG. 1, so that it may be used in a terrestrial vehicle or a satellite in space without relying on gravity to assist the feed to the pump.

Figure 2:
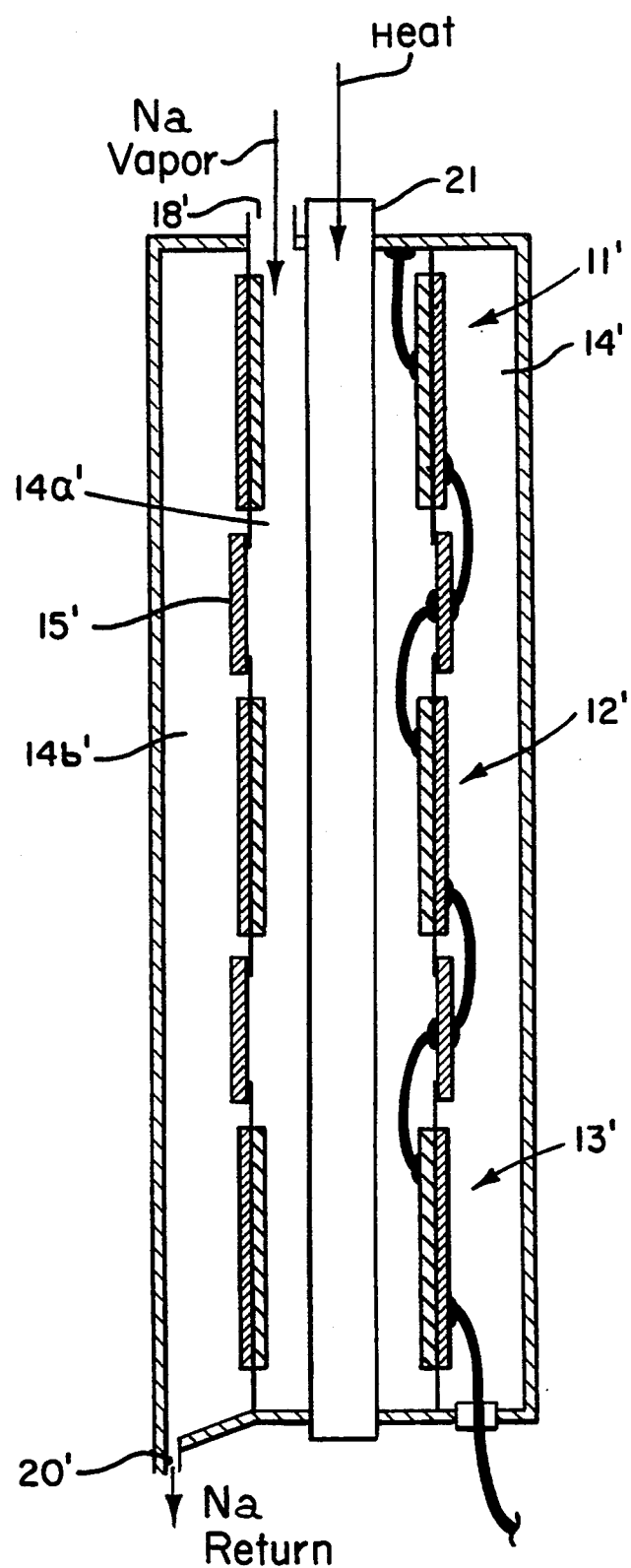
FIG. 2 illustrates the concept of the present invention with three series-connected annular AMTEC cells in a vapor-vapor plenum (vapor in and vapor out).

The concept thus illustrated in FIG. 1 is used in a preferred embodiment illustrated in FIG. 2 comprising a cylindrical plenum 14' and three cylindrical cells 11', 12' and 13' brazed to cylindrical metal connectors 15' to form a tubular wall within the plenum 14'. The heated Na vapor is introduced from the boiler 19 (FIG. 1) at pressure through a port 18' at one end of the inner chamber 14a' formed by the cells connected electrically and structurally in series, and condensed vapor is returned through a port 20' at an opposite end of the outer chamber 14b'.

The preferred embodiment also uses a rod or pipe 21 to heat the Na vapor and cells, thereby preventing condensation of Na vapor on the electrodes which could short adjacent cells or short the cell electrodes to the heater rod or pipe 21. In the vapor phase, Na is an excellent electrical resistor at these temperatures and pressures with a resistivity of greater than $10^{19} \Omega cm$, but in a liquid phase it is a good electrical conductor.

The three-cell configuration shown in FIG. 2 would operate at approximately the same specific power ($W/cm^2$ of cathode area) as a single AMTEC cell of the same cathode area; however the output voltage would be three times larger than from a single AMTEC cell and total current would be one third as large as from a cell of the same cathode area. Thus, the current carrying leads between cells could be made smaller than if three single AMTEC cells were to be connected electrically in series for higher voltage and without incurring significant power loss due to lead resistance. Even greater increases in voltage and reductions in current could be realized in accordance with the present invention by connecting more vapor-vapor cells in series within the plenum.

In addition to a higher voltage output, the present invention eliminates two possible long term degradation mechanisms. First, previous phase change designs require Na refluxing on the high pressure side of the ceramic plate B of each cell which separates the anode A from the cathode C of the cell. This could lead to degradation of the ceramic plate since Na might extract oxygen from the electrolyte and thus degrade the conductivity of the ceramic plate, especially at higher temperature operation. Without the refluxing of the Na, this degradation cannot occur. Second, series connecting individual AMTEC modules as envisioned by some to increase voltage would require a current carrying feedthrough between single cell modules at high temperature. The insulator for this feedthrough may be subject to chemical attack by the high temperature Na. A breakdown of the insulator and the resulting electrical shorting of the conductor to the surrounding structure would bypass the module electrically. The module would then be unable to contribute power to the network.

The present invention reduces the need for a high temperature feedthrough since the cells are internally connected in a single plenum. The higher voltage power can be withdrawn from the plenum with a feedthrough at a cooler temperature without significant loss, as shown in FIG. 1 using an $Al_2O_3$ insulator 21. The electrode at the other end of the series connected cells is internally connected to the plenum by brazing, and the other end of the load is connected to the outside of the load 22. The cell to cell connections of the three series-connected cells are made internally by brazing without the need for any insulation to avoid the risk of shorting cells. Feedthrough to a load under these conditions will have a much longer lifetime and is thus less likely to limit the life of the three-cell module.

The general concept described above with reference to FIGS. 1 and 2 is not limited to the geometries shown. Many other arrangements that meet the criteria of vapor-vapor cells connected in series can be envisioned. These include not only other flat plate arrangements and externally heating the cells of the flat plate arrangements, but also designs with the high pressure vapor in the outside chamber of the tubular series-connected cell arrangements while cooling the inside chamber. The Na vapor feed may be from a boiler positioned proximate the input end of the cell stack or from a boiler more remotely positioned. The Na vapor may be supplied in a continuously flowing stream with excess vapor returned to the boiler, or the Na vapor may be static in the plenum except for flow due to the Na passing through the cells. The Na vapor feed may be superheated, in which case any additional heater at the cell stack may not be necessary or the vapor may be saturated, in which case greater care must be exercised to prevent Na vapor condensation that might short the cell electrodes.

The performance of a vapor-vapor AMTEC cell can be confidently predicted based on the demonstrated performance of prior-art AMTEC cells and a nonpower producing vapor-vapor cell. As stated above, prior-art AMTEC cells use a Na liquid anode and a porous metal cathode. The performance of these cells has been described by a cathode performance model [R. M. Williams, M. E. Loveland, B. Jeffries-Nakamura, M. L. Underwood, C. P. Bankston, H. Leduc and J. T. Kummer, "Kinetics and Transport at AMTEC Electrodes, I. The Interfacial Impedance Model," *J. Electrochem. Soc.*, 137, 1990, pp. 1709–1716; R. M. Williams, B. Jeffries-Nakamura, M. L. Underwood, C. P. Bankston and J. T. Kummer, "Kinetics and Transport at AMTEC Electrodes, II. Temperature Dependance of the Interfacial Impedance of $Na_{(g)}$/Porous Mo/Na-B Alumina," *J. Electrochem. Soc.*, 137, 1990, pp. 1716–1723]. The model describes all the major losses of the liquid-vapor AMTEC cell including ohmic losses in the BASE, kinetic losses at the BASE/cathode interface, and mass transport losses through the porous cathode. The model assumes that no mass transport or kinetic polarization occurs at the Na liquid anode/BASE interface. Experimental evidence supports this assumption.

For a vapor-vapor cell, the anode polarization cannot be assumed to be zero. The mass flow impedance of Na from the vapor through the porous anode to the anode/ceramic interface can be calculated as a function of anode porosity, temperature, ambient Na pressure, and current density. The mean free path of Na atoms in the vapor at about 1 atm of pressure and 1200° K. temperature will be a few tenths of a micrometer. Thus, the Na vapor will pass through the porous electrode in viscous flow with the pressure drop proportional to the current density. At maximum power (near 1 $A/cm^2$), the pressure drop through the electrode will be about 2% of the bulk Na vapor pressure. This pressure drop corresponds to a depression of the operating voltage of less than 0.2% of the open circuit voltage. Since this mass flow resistance is so small, the cell could also be constructed with a thick, porous anode as structural support for a thin ceramic plate which would result in significantly smaller overall impedance for the cell for temperatures above 450° C.

An additional component of the anode polarization will result from kinetic losses at the anode/ceramic interface. These losses have been studied extensively at the cathode/ceramic interface. These studies have demonstrated that at high Na pressures, the overpotential becomes vanishingly small. The anode will always have high Na pressure so the kinetic loss at this interface will be small.

The primary difference between the processes at the cathode and anode of the vapor-vapor cell of FIGS. 1 and 2 is the direction of the Na flow. The principles described above for the anode have been developed from processes at the cathode. However, the model has recently been demonstrated to predict anode behavior as well through the use of a nonpower producing vapor-vapor cell called the vapor exposure test cell (VETC). In the VETC, two electrodes on a BASE ceramic plate in the presence of a Na vapor are polarized with respect to each other. The current-voltage behavior of the cell is as predicted by the cathode model extended to the anode as well. Thus the applicability of the model to the anode of a vapor-vapor cell is demonstrated.

The connector plates 15 and 15' between adjacent cells in the vapor-vapor cell stack introduce shunt current problems that are more important than in previous cell designs. This is a result of the number of connector plates and the possibility for a large potential difference across the BASE ceramic plates. The connector plates are preferably sealed to the BASE ceramic plates by a metal to ceramic braze, but may also be sealed by a compression seal, or other appropriate means.

All AMTEC cells share the need for a BASE ceramic to metal seal. The seal can serve as a location for shunt currents which will occur where Na or electrons can be transported down an activity gradient. Shunt currents have been found in typical AMTEC cells to be within acceptable limits and cause no significant power or efficiency loss. Nevertheless, precaution is to be taken to avoid shunt currents.

Figures 3, 4:
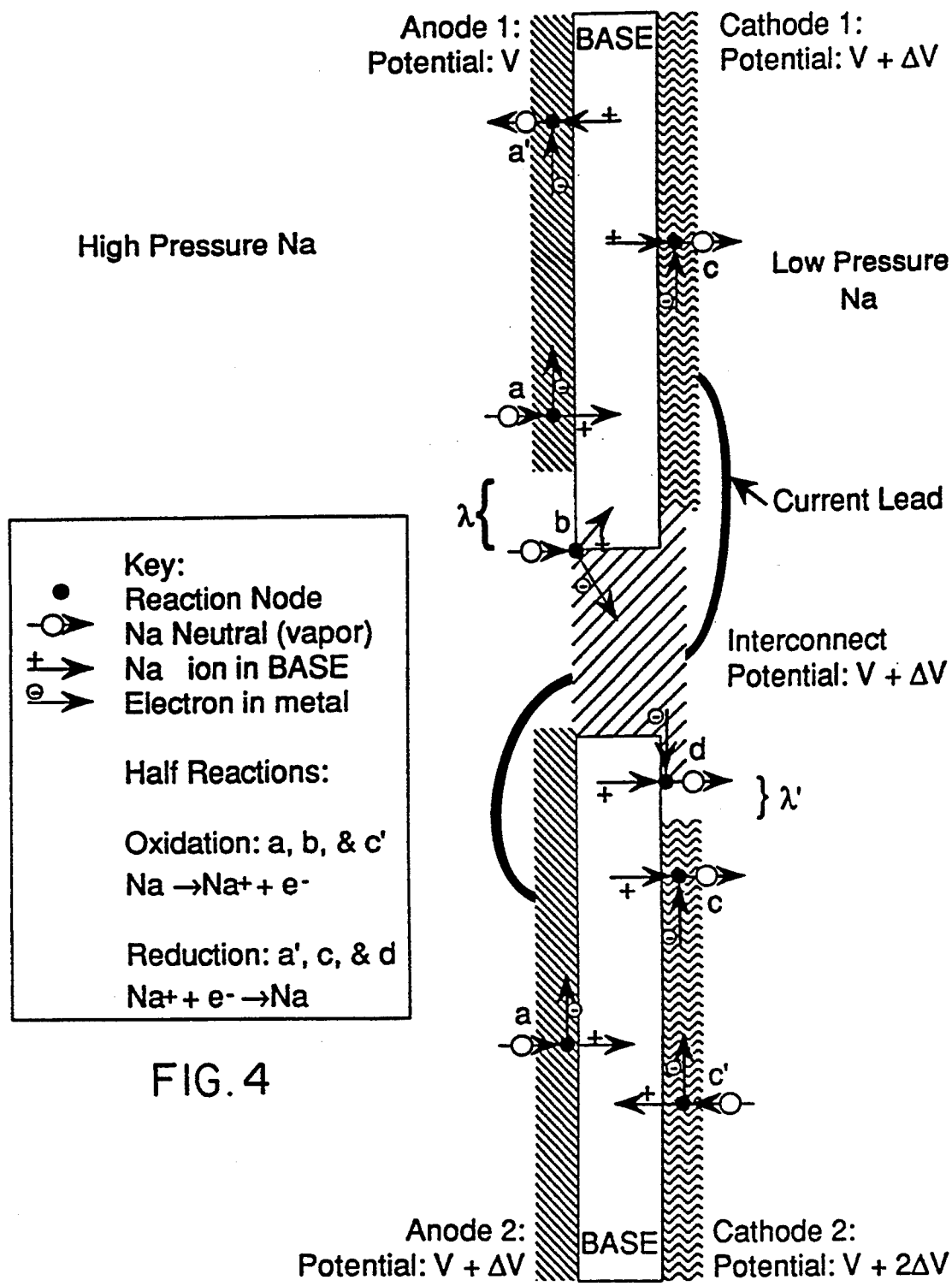
FIG. 3 is a diagram illustrating diagrammatically vapor-vapor cell shunt currents in the embodiment illustrated in FIG. 1, which is applicable as well to the embodiment of FIG. 2.
FIG. 4 illustrates a key to the symbols used in the diagram of FIG. 3.

In the proposed series stacked cells, each connector plate provides several locations for shunt currents to develop. FIG. 3 schematically describes the possible shunt currents as a combination of electrochemical half reactions. FIG. 4 illustrates a key to the symbols used in FIG. 3. The half reactions labeled a, b, and c' are the Na oxidation reaction

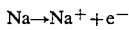

The reverse reaction, $Na^+$ reduction, is labeled a', c, and d:

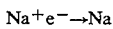

The reactions a and a' are the forward and reverse reactions at the anode; while the reactions c and c' are the forward and reverse reactions at the cathode. The half reaction b occurs at the BASE/interconnect/low pressure Na vapor three phase region.

Two types of shunt currents can develop as a sum of these half reactions. The first type is driven by the Na pressure gradient. The half reactions b and c (at cathode 1) can combine or the half reactions a (at anode 2) and d can combine. These currents require electrons from reaction a or b to enter the interconnect and travel to the Na reduction site (c or d, respectively). Both reactions result in a net flow of Na across the cell. These reactions will occur independent of the potential on the cell and are driven by the Na pressure difference.

A second type of shunt current arises from the cell potential independent of the Na activities. A potential difference from anode 1 to the interconnect creates an electron activity gradient across the bare BASE region of length $\lambda$. The sum of reactions a' and b transfers electrons down this gradient but results in a net separation of charge. Reactions a and c can combine to alleviate this imbalance. Since a and a' are opposite reactions, the net reaction is b+c which is identical to one of the Na activity driven currents described above. A similar shunt current arises from the potential difference between the interconnect and cathode 2. This potential difference drives reactions d, c', a, and c with a net reaction of a+d. As above, these shunt currents result in a net flow of Na across the cell from the anode to the cathode side. However, the driving force is the potential difference and not the Na pressure difference.

The reactions a and a' and c and c' occur at high rates in the presence of Na vapor. In fact, reactions a and c are required for power production in the AMTEC. Thus, the magnitudes of the shunt currents are limited by the rates of the reactions b and d. These rates are expected to be small due to the small three phase reaction zone area relative to the three-phase area in the electrodes. In liquid-vapor AMTEC experiments, the Na activity gradient shunt current has been estimated as large as 100 mA. For vapor-vapor cells, a shunt current this large at each interconnect would rob the cell of significant power. In order to reduce these currents, two methods could be used. First and most simply, increase the distance of bare BASE between the interconnect and the adjacent electrode of different potential. This distance is shown as $\lambda$ or $\lambda'$ on FIG. 3. The distance should be increased so that the potential difference divided by the BASE resistance (the maximum shunt current) is acceptably small.

A second more compact method to reduce the shunt current is to cover the three-phase reaction area at b and d with a nonporous insulator such as sputtered $\alpha$-alumina, AlN, or similar material. This covering would increase the vapor-phase mass transport impedance to or from the reaction site to a large value and reduce the resulting shunt current to a small value. Since high pressure Na might attack the insulating material covering site b, it is recommended that increasing the bare BASE length $\lambda$ be used to reduce the reaction at site b, while covering the reaction area at site d is more appropriate for the low pressure Na environment.

The possibility for a large potential difference across a small piece of BASE ceramic must also be considered. This possibility is most serious at the point where the last, highest potential cell in a stack is sealed to the support structure. Care must be exercised in the design to prevent this potential difference from becoming large enough to cause electrical breakdown of the BASE. One way to avoid this problem is to set the potential of the cells at the end of the stack as the lowest potential and then series connect the cells toward the center. The stack end to support connection would have the same possibility for shunt currents and shunt current reduction methods as any two adjacent cells, but no possibility for BASE breakdown will occur. The two parallel stacks starting from the ends would terminate with the same potential at the center cell.

The proposed vapor-vapor AMTEC cell replaces the more common liquid Na anode with a porous metal anode which is fed by a high pressure Na vapor. This results in the possibility of series connecting several cells with a single Na feed. The resulting cell stack will have nearly the same power density as a single cell AMTEC, but the output voltage will be many times higher with a correspondingly lower output current. The resulting reduction in volume and mass of current leads, power conditioning equipment, and the Na boiler will result in a system more desirable for many applications.

We claim:

1. An array of alkali metal thermoelectric converter cells electrically connected in series utilizing a metal alkali vapor at a high temperature and desired vapor pressure from a boiler into a plenum separated into two chambers by a wall of said cells, said metal alkali vapor passing through said cells from a chamber in said plenum on one side of said wall and returning after condensation at a chamber on an opposite side of said wall at a lower pressure than said vapor pressure at said chamber in said plenum at said one side of said wall, each cell comprising, a porous solid electrolyte plate, a first porous metal layer deposited on one side of said solid electrolyte plate, said first metal layer functioning as an anode, a second porous metal layer deposited on a side of said solid electrolyte plate opposite said first metal layer, said second metal layer functioning as a cathode, conductive metal plates between said cells, one metal plate between each pair of adjacent cells for bridging gaps between solid electrolyte plates of said series-connected cells, said metal plates being connected to said solid electrolyte plates by seals, thereby forming a sealed wall in said plenum with said cells, said wall being sealed to said chamber along all edges thereof with walls of said plenum, means for electrically connecting said cells in series comprising an electrical connection of each cathode of a cell to said metal plate between adjacent cells and each anode of a cell to said metal plate between said adjacent cells, means for providing an electrical connection from said anode of a first cell of said array to said load, and means for providing an electrical connection to said load from said cathode of a last cell of said array.

2. An array of alkali metal thermoelectric converter cells as defined in claim 1 wherein said cells are planar in construction to form a planar wall.

3. An array of alkali metal thermoelectric converter cells as defined in claim 2 wherein said cells are annular in construction to form a tubular wall, and said plenum is cylindrical, said plenum having a port at one end thereof for introduction of said vapor to said plenum, and a port at an end opposite said one end of said plenum for returning said vapor after passing through said cells and condensing on walls of said chamber on said opposite side.

4. An array of alkali metal thermoelectric converter cells as defined in claim 3 including a core positioned along the axis of said plenum for heating said annular cells.

* * * * *